(12) United States Patent
Weinman et al.

(10) Patent No.: US 8,601,335 B2
(45) Date of Patent: Dec. 3, 2013

(54) INTERNET PROTOCOL MULTICAST WITH INTERNET PROTOCOL UNICAST/MULTICAST ERROR CORRECTION

(75) Inventors: Joseph Weinman, Basking Ridge, NJ (US); Cameron S. Blandford, Newport News, VA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/565,181

(22) Filed: Aug. 2, 2012

(65) Prior Publication Data

US 2012/0297265 A1 Nov. 22, 2012

Related U.S. Application Data

(63) Continuation of application No. 12/181,077, filed on Jul. 28, 2008, now Pat. No. 8,261,148.

(51) Int. Cl.
*G08C 25/02* (2006.01)

(52) U.S. Cl.
USPC .......................................................... 714/748

(58) Field of Classification Search
None
See application file for complete search history.

(56) References Cited

U.S. PATENT DOCUMENTS

| | | | |
|---|---|---|---|
| 5,459,825 A | 10/1995 | Bodner et al. | |
| 6,278,716 B1 | 8/2001 | Robenstein et al. | |
| 6,415,312 B1 | 7/2002 | Boivie | |
| 6,782,490 B2 | 8/2004 | Maxemchuk et al. | |
| 7,209,559 B2 | 4/2007 | Rodriguez et al. | |
| 7,224,702 B2 | 5/2007 | Lee | |
| 7,289,500 B1 * | 10/2007 | Amlekar | 370/390 |
| 2003/0031175 A1 * | 2/2003 | Hayashi et al. | 370/390 |
| 2006/0198326 A1 | 9/2006 | Yang et al. | |
| 2007/0011237 A1 | 1/2007 | Mockett | |
| 2007/0213081 A1 | 9/2007 | Zhang | |
| 2008/0008167 A1 | 1/2008 | Ver Steeg | |
| 2008/0031177 A1 | 2/2008 | Lee et al. | |
| 2008/0049789 A1 | 2/2008 | Vedentham et al. | |
| 2010/0023828 A1 | 1/2010 | Weinman et al. | |

* cited by examiner

*Primary Examiner* — Michael Maskulinski
(74) *Attorney, Agent, or Firm* — Akerman Senterfitt; Michael K. Dixon; Roy Zacheriah

(57) ABSTRACT

A method of delivering digital information includes joining a multicast group, and receiving a segment from a server directed to the multicast group. Further, the method further includes determining a transmission error has occurred resulting in an incomplete segment, and sending an error notification to the server requesting retransmission of at least a portion of the incomplete segment. Additionally, the method includes receiving a retransmission of the at least a portion of the incomplete segment. The at least a portion of the incomplete segment may be received through an IP unicast connection or as a multicast retransmission.

20 Claims, 6 Drawing Sheets

INTERNET PROTOCOL MULTICAST WITH INTERNET PROTOCOL UNICAST/MULTICAST ERROR CORRECTION

CROSS REFERENCE TO RELATED APPLICATIONS

This application is a continuation of U.S. patent application Ser. No. 12/181,077, entitled "Internet Protocol Multicast with Internet Protocol Unicast/Multicast Error Correction," filed on Jul. 28, 2008, the disclosure of which is hereby expressly incorporated by reference in its entirety.

FIELD OF THE DISCLOSURE

The present disclosure generally relates to communications networks, and more particularly relates to file transfer through Internet Protocol (IP) multicast with IP unicast/multicast error correction.

BACKGROUND

Traditionally, movies and other media programs have been distributed to theaters on film for display to audiences. As the film is repeatedly shown to audiences, the film experiences wear that affects the user experience during subsequent viewings. Additionally, the time required to manufacture and distribute each copy of the film makes last minute changes difficult.

More recently, advances in digital projection technology have made it possible for theaters to show movies to audiences without the need for film. A digital copy of the movie can be stored and repeatedly shown to audiences without the degradation associated with film. Additionally, digital production technology allows the movie to be recorded and edited entirely in a digital format. Changes can be made directly to the digital master, and copies can then be distributed to theaters without transferring the movie to film.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
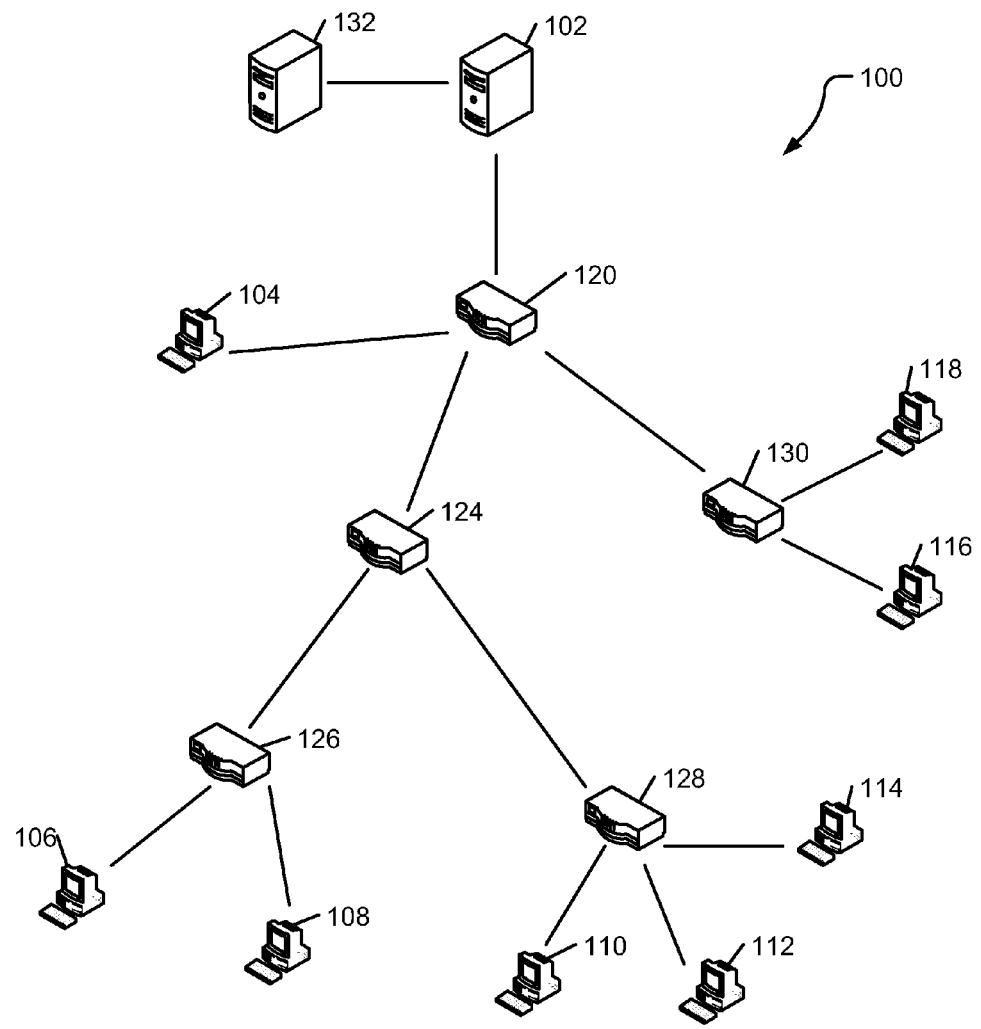
FIG. 1 is a diagram illustrating a digital information distribution network in accordance with one embodiment of the present disclosure.

FIG. 1 shows a multicast tree 100 for distributing digital content through a geographically dispersed network, such as the Internet. Multicast tree 100 can include a server 102 and client systems 104 through 118. Server 102 and client systems 104 through 118 can communicate through a network of distribution points 120 through 130. The distribution points 120 through 130 may be routers. Alternatively, the distribution points 120 through 130 may be nodes of an overlay network. For example, communication from server 102 can travel through distribution points 120, 124, and 126 to client system 108 while communication from server 102 can travel through distribution points 120 and 130 to client 116. It will be appreciated that multicast tree 100 may be a logical overlay of a mesh network that, for example, may have a direct connection from distribution point 130 to 128, and also, for example, may have a direct connection from distribution point 126 to 130. These distribution points may be multicast-enabled routers, or may also have the ability to cache content for immediate forwarding but also later retransmission. In an embodiment, the server 102 can be a distribution node or edge server of a content delivery network. As such, the server 102 can receive digital content for distribution from an origin server.

In an embodiment, server 102 can be a digital cinema distribution server and client systems 104 through 118 can be digital storage and projection systems located at multiple movie theaters. Server 102 can distribute a digital movie through multicast tree 100 to the clients. Each client system can store the digital movie and provide playback of the digital movie for an audience. The digital movie can be distributed to the client systems prior to playback, rather than in real-time.

In an alternate embodiment, server 102 may be a video superhub location, endpoints 104 through 118 may be set top TV boxes capable of receiving a video file for later playback, and system 100 may be used to distribute home video or digital audio content.

In an alternate embodiment, server 102 can be a distributed computing server and client systems 104 through 118 can be computational nodes for processing a distributed computing project. Server 102 can distribute a work file containing the data for the distributed computing project to client systems 104 through 118. Each client system can process the same data but apply a different algorithm or transformation, and return a result to server 102 or to a different server (not shown).

Server 102 can use IP multicast or any other multicast protocol to substantially simultaneously distribute a data file, such as a digital movie or a work file, to the client systems 104 through 118. The data file can be divided into multiple segments or data packets (not to be confused with an IP packet, Ethernet frame, or similar lower layer packet). Using IP multicast, each such segment or data packet can move over each link of the network only once. The distribution points 120 through 130 can create copies, or otherwise forward incoming data on one port to multiple outbound ports, when the paths to the destinations split. For example, server 102 can send a multicast data packet to distribution point 120. Distribution point 120 can send a copy of the data packet to each of client 104, distribution point 124, and distribution point 130. Similarly, distribution point 130 can send, forward, or route, a copy of the segment, data packet, or individual low layer packets to each of client systems 116 and 118, and distribution point 124 can send a copy of the data packet to each of distribution points 126 and 128. Further, distribution point 126 can send a copy of the data packet to each of client systems 106 and 108 and distribution point 128 can send a copy of the data packet to each of client systems 110, 112, and 114. In other embodiments, the network underlying multicast tree 100 may be a shared medium, such as a bus or ring, with multicast occurring at a low network layer via common physical components and a common media access structure.

A controller 132 interacts with origin server 102, distribution points 120 to 130, and optionally endpoints 104-118. The controller 132 can include a policy database, a network map, a status monitor, and director. In an embodiment, the controller 132 can be implemented as software, hardware, or any combination thereof. Additionally, the controller 132 can be incorporated into origin server 102 or operate as a separate system. The policy database can contain information, such as the maximum number of simultaneous threads, bandwidth caps on various network links, the network cost of various links, and so forth. The network map can contain a map of the topology of the underlying physical network, node and link capacity, and virtual overlay networks such as multicast groups and their tree structure. The status monitor can contain dynamically changing information, such as files to be distributed, how they have been partitioned into segments and sub-segments, which endpoints have received which segments and subsegments, which links or nodes are out of service, and so forth. The director can use information from the policy database, the network map, and the status monitor to direct origin server, distribution points, and optionally endpoints to transmit information, join or leave multicast groups, and the like.

Generally, the multicast tree 100 is constructed by the distribution points when clients systems join an IP multicast group and the server 102 may not have information about each member of the IP multicast group. Specifically, client systems can notify the network that they are interested in receiving data packets sent to the IP multicast group, such as by Internet Group Management Protocol. The server 102 can send a message addressed to the IP multicast group and each distribution point can replicate the data packet for each system of the IP multicast group.

The multicast tree 100 includes five multicast subtrees, each defined by a respective root node coupled with a path to the root node from the origin server 102. For example, there is a sub tree comprising distribution node 126 as well as endpoints 106 and 108, coupled with path 102-120-124-126. There is also a sub-tree rooted at 124, further comprising 126 and 128, and endpoints 106 through 114. It further comprises the path 102-120-124.

When IP multicast is used for other applications such as real-time streaming, e.g., for live video conferencing, retransmission of the data packet may not be possible before the information is no longer needed. Typically, a small number of lost or corrupted data packets can be ignored and playback of the real-time stream can continue without interruption. However, when a data file needs to be distributed without packet loss, retransmission of lost or corrupted data packets can be necessary. The server 102 can retransmit lost or corrupted data packets when a client system notifies the server 102 of a network error resulting in a lost or corrupt data packet.

In an embodiment, transmissions from the origin server 102 to endpoints 104 to 118 can occur sequentially. For example, first a multicast from origin server to all endpoints of segment 1, then a multicast of segment 2, then a multicast of segment 3, and so forth. Retransmission of segments by unicast to specific endpoints, e.g., a unicast of segment 372 to endpoint 104 and a unicast of segment 398 to endpoint 106, may follow the multicast until all segments have been acquired by all endpoints. In another embodiment, the retransmission of segments may occur simultaneously or in an overlapping fashion. For example, first a multicast from the origin server to all endpoints of segment 1. While segment 2 is being multicast, a unicast of a subsegment of segment 1 to endpoint 104 can occur. At any given time, there may be one or more segments being multicast across one or more multicast trees, and/or one or more segments being unicast to one or more endpoints. Additionally, multicast trees may be dynamically created to retransmit packets to multiple sub-trees.

Figure 2:
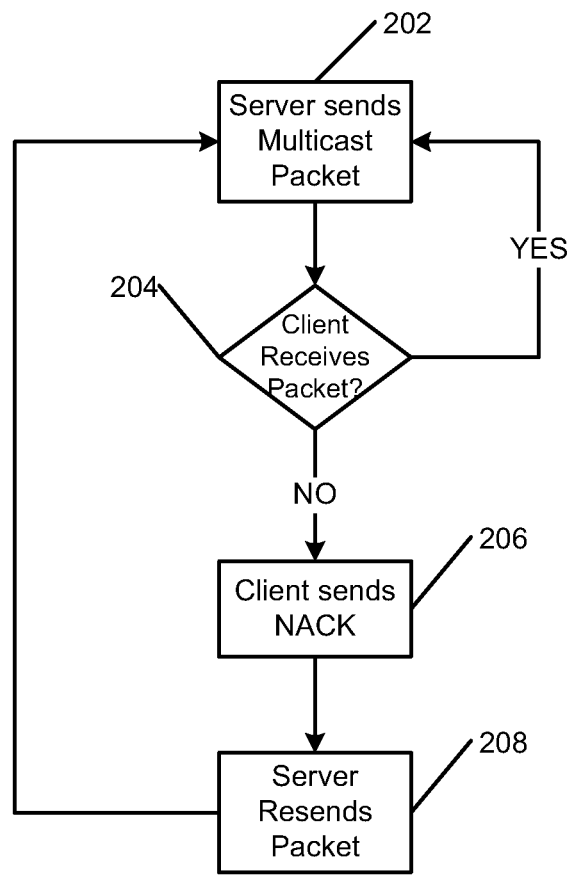
FIGS. 2 through 4 are flow diagrams illustrating exemplary methods of correcting network errors during an IP multicast of digital content.

FIG. 2 illustrates an exemplary method of distributing digital content, such as for digital cinema, to a plurality of clients through a network such as multicast tree 100. At 202, a server such as server 102 can transmit the digital content to plurality of clients, such as clients 104 through 118. The digital content can include a digital movie, a software update, a work file for a distributed computing project, or other digital file. The digital content can be split into a series of data packets. Each data packet can be assigned a serial identifier to uniquely identify the data packet and to indicate an order of the data packets for reassembling the digital content. The data packets can be transmitted to an IP multicast group. At 204, a client can determine if a network error has caused a data packet to be corrupted or lost. Error detection and correction codes included in the data packet can be used to correct data packets with a small number of bit errors. However, data packets with a large number of bit errors may require retransmission. When the client determines that the multicast data packet has been received correctly, the client waits for the server to send another multicast data packet at 202.

Figure 3:
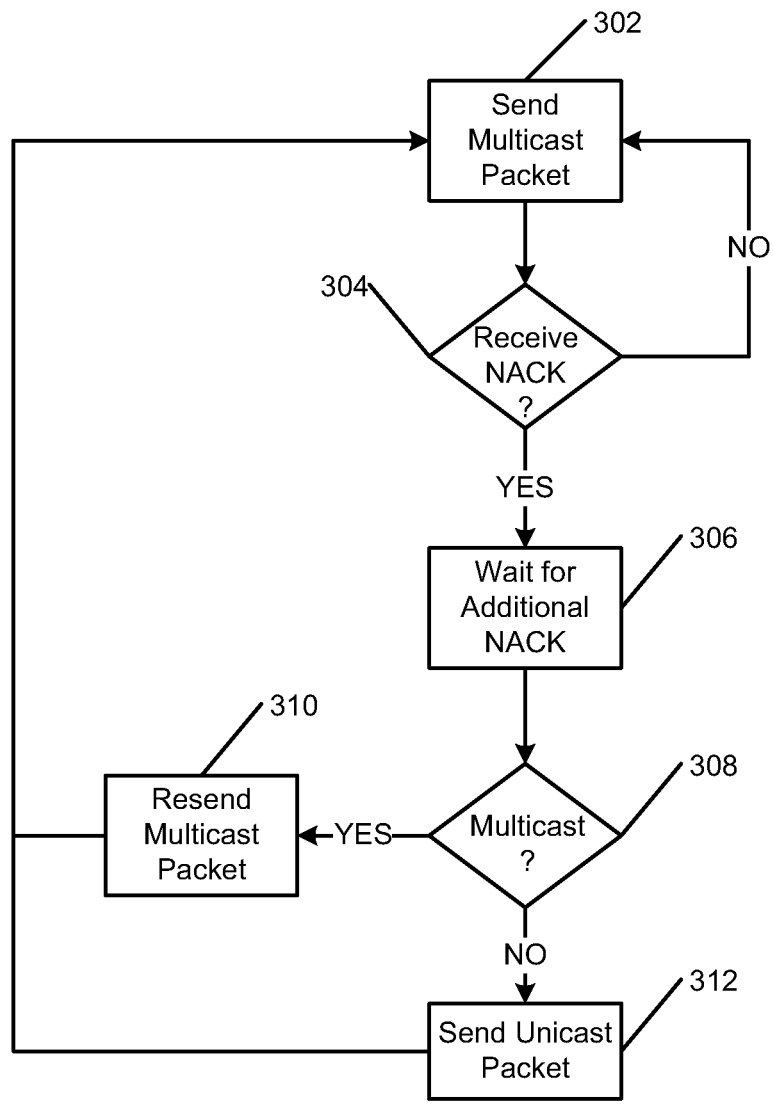

Alternatively, returning to 204, when a network error results in a client not receiving a data packet, the client can send a packet error notification, such as a negative acknowledgement (NACK), to the server as illustrated at 206. The packet error notification can include the serial identifier and a request to resend the identified data packet. Additionally, the packet error notification can identify the client requesting the data packet to be resent. At 208, the server can resend the data packet identified in the packet error notification to the client. The server can resend the data packet using either IP unicast or IP multicast, depending on the packet error notifications received by the server for the data packet. For example, when a small number of clients send a packet error notification for the data packet, the server can establish an IP unicast connection, such as a TCP connection, to each client to resend the data packet to each client individually. Alternatively, when a large number of clients send a packet error notification for the data packet, the server can resend the data packet to one or more IP multicast groups and/or dynamically created sub-trees FIG. 3 illustrates an exemplary method for distributing digital content using a multicast tree, such as multicast tree 100. At 302, a server such as server 102 sends a multicast data packet to an IP multicast group. The multicast data packet can include a number of bytes of the digital content. Additionally, the multicast data packet can include a serial identifier to uniquely identify the data packet and indicate the data packet order. At 304, the server can listen for a packet error notification, such as a NACK. The time between sending the multicast data packet and receiving the packet error notification can include a network delay and a delay for detecting a lost data packet. Consequently, the server can continue to send multicast data packets at 302 while waiting for the packet error notification at 304. When the server receives a packet error notification, the server can wait for packet error notifications from additional clients for the same data packet, as illustrated at 306. Waiting for packet error notifications from additional clients can allow the server to resend the data packet to a number of clients substantially simultaneously. At 308, the server can determine if the data packet should be resent as a multicast. When a large number of clients, such as greater than a predefined number of clients or greater than a predefined percentage of the IP multicast group, require retransmission, then the server can resend the data packet to the IP multicast group as illustrated at 310. In an embodiment, the data packet may be resent as part of the original IP multicast session. The server may utilize the original IP multicast network to resend all of the lost or corrupt data packets after the original transmission is complete. Alternatively, the server may periodically interrupt the original transmission to resend lost or corrupt data packets. When the server resends all the lost or corrupt data packets at the end of the IP multicast session, clients may leave the IP multicast session once they have received all the data packets. Additionally, the server may order the data packets to allow clients to leave the IP multicast session. For example, the most requested data packets may be resent first.

In an alternate embodiment, a separate IP multicast session can be established to resend the data packet. For example, when the server is aware of the topology of the multicast tree and the clients requesting the data packet to be resent are located within a common branch of the multicast tree, the server can establish a second multicast group consisting of the branch of the original multicast tree to serve the data packet. Alternatively, when the server determines that the clients belong to a common geographic region or autonomous system, the server can establish a separate multicast group to serve the data packet.

Returning to 308, when the number of clients requesting that the data packet be resent is small, the server can resend the data packet by establishing an IP unicast connection to each of the clients, as illustrated at 312. The server may establish a TCP connection with each client. The TCP connection can provide reliable delivery of the resent data packet. Additionally, the server can resend multiple data packets over the same TCP connection by waiting until several data packets need to be resent to a client, such as near the end of the multicast session. Resending multiple data packets over the same TCP connection can reduce the overhead required for establishing TCP connections. In an alternate embodiment, the IP unicast data packet may be sent using UDP and alternative mechanisms can be employed to ensure delivery.

Figure 4:
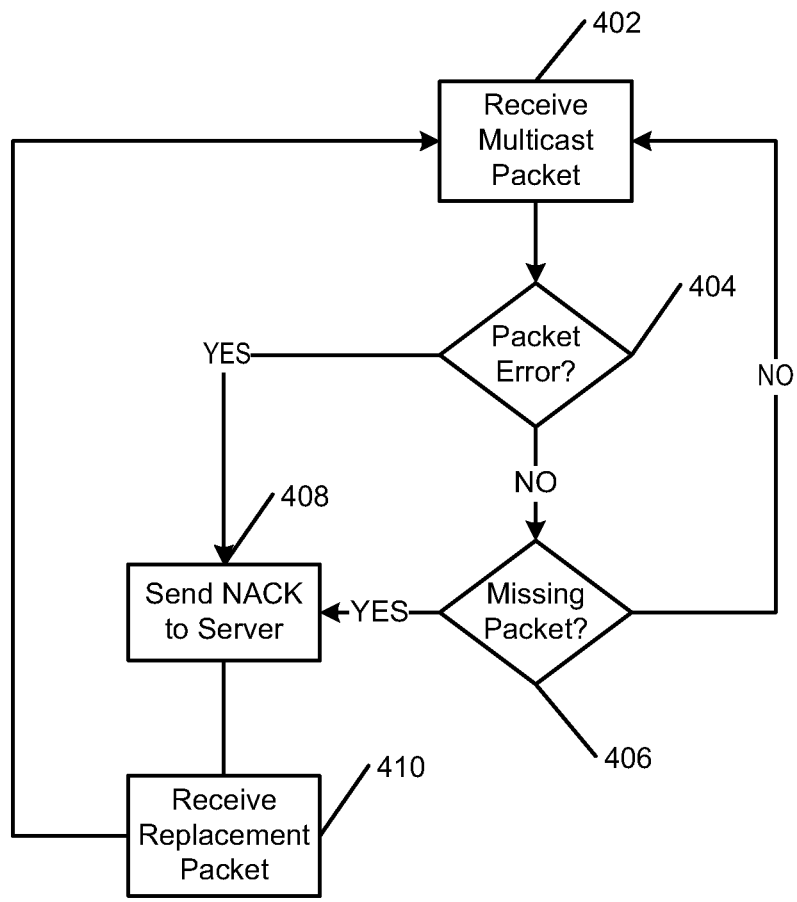

FIG. 4 illustrates an exemplary method for receiving digital content using a multicast tree. At 402, the client can receive a data packet as part of an IP multicast session. The data packet can include a number of bytes of the digital content. Additionally, the data packet can include a serial identifier to uniquely identify the data packet and indicate the packet order. At 404, the client can analyze the data packet to determine if an error has occurred. For example, the data packet can include an error detection and correction code that can be used to identify when an error has occurred in transmission of the data packet. Additionally, the error detection and correction code can be used to correct the error when the error consists of a small number of bits. Alternatively, a larger error can require the retransmission of the data packet. When the data packet does not require retransmission, the client can determine if a prior data packet has been lost, as illustrated at 406. The data packets can be sent in order, as determined by their serial identifier. When a data packet is received, the client can determine if a data packet with a lower serial identifier has not been received. Due to network conditions, packets may arrive out of order. Consequently, the client may wait a period of time after detecting a lost packet before sending a request to resend the lost data packet. When no missing data packets are detected, the client can continue to receive data packets at 402.

When a data packet error that requires retransmission is detected at 404, or a missing data packet is detected at 406, the client can send a packet error notification, such as a NACK, to the server as illustrated at 408. The packet error notification can request retransmission of the lost or corrupt segment or data packet identified by the serial identifier or a segment identifier. At 410, the client can receive a replacement data packet sent to an IP multicast group or send through an IP unicast connection. Additionally, the client can continue to receive data packets as part of an IP multicast session at 402. To optimize network resources, optimal information encoding may be used, e.g., if all but 1 of 10,000 segments or data packets have been received, it is unnecessary for the endpoint to send 9,999 positive acknowledgements and 1 negative acknowledgement. For example, endpoint 104 may send an acknowledgement indicating receipt of all segments from 1 through 10,000 except for segment 2723. Such encoding mechanisms can include bitmaps of received information. Additionally, distribution points can consolidate acknowledgement messages. For example, distribution point 128 could consolidate 3 such messages from endpoints 110, 112, and 114 to flow a negative acknowledgement back to origin server 102 indicating that distribution point, and therefore endpoints 110 through 114, received all segments from 1 through 10,000 except #2,723.

Figure 5:
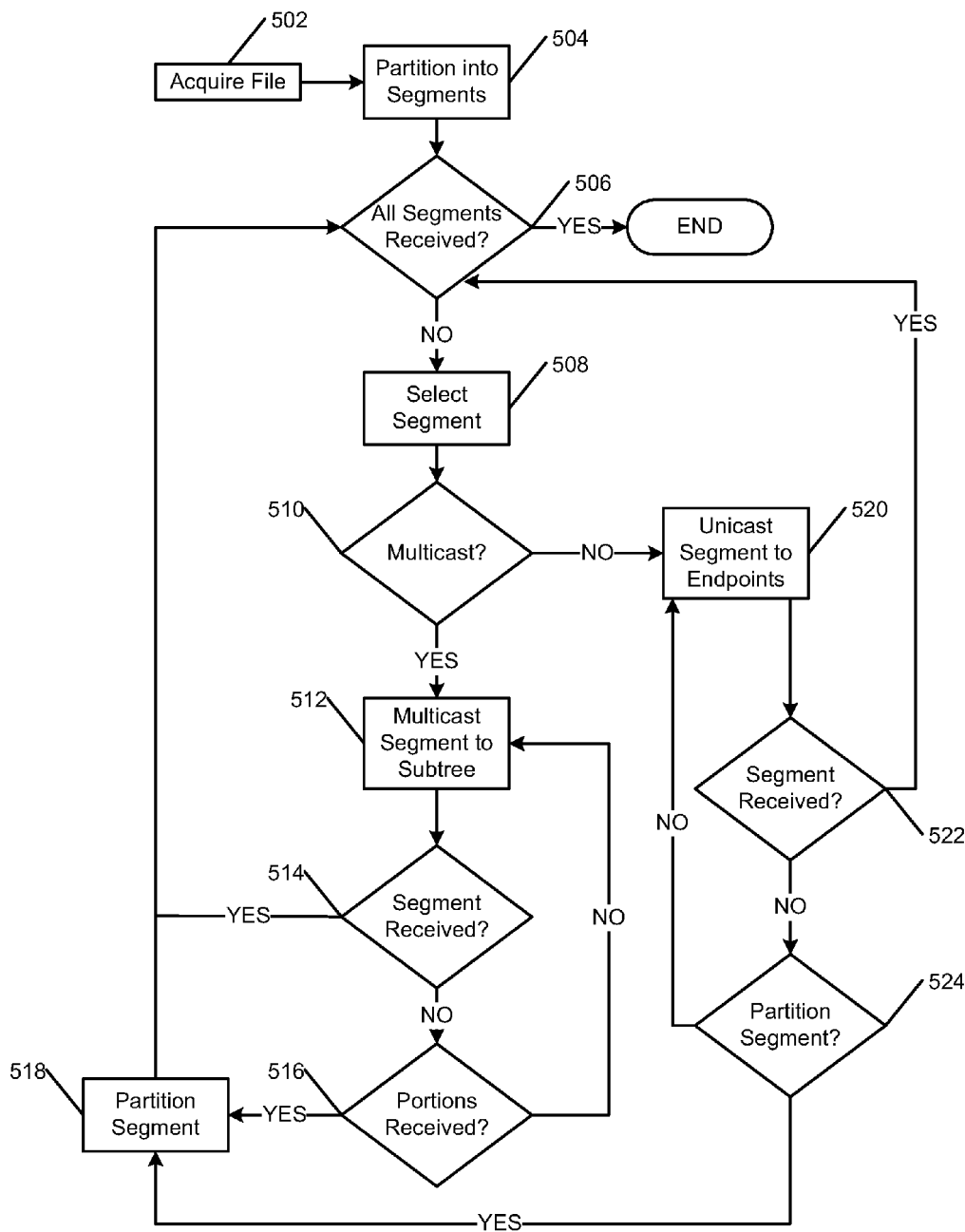
FIG. 5 is an flow diagram illustrating an exemplary method of distributing digital content.

FIG. 5 illustrates an exemplary method for distributing digital content through IP multicast. At 502, a server such as server 102 can acquire a file to be distributed. In step 504, the file can be partitioned into one or more segments. In step 506, the server can determine if there is a segment that has not been received by all endpoints. When all segments have been received by all endpoints, distribution of the file can be complete. Alternatively, when at least one endpoint has not received a segment, a segment can be selected for distribution as illustrated at 508. In an embodiment, multiple segments can be distributed in parallel. Determination of whether to distribute multiple segments in parallel can be made in accordance with a policy. The policy can be based on managing maximum bandwidth on a given link, or on meeting a distribution time window objective. For example, consider a digital cinema application. If opening night and time for the movie is at 7 PM, it is 6:55 PM, and two segments remain to be transmitted: the opening title sequence and the closing credits, it may be preferable to multicast and then unicast the title sequence first, and unicast the credits after the title sequence has been received by all endpoints. Additionally, a policy can prioritize endpoints such that a unicast of a first segment to a high priority endpoint can precede a unicast of a second segment to a low priority endpoint. For example, it can be preferable to ensure that a 1000 seat theatre, or very large metro region, receive the entire file preferentially to a smaller theatre or region. Further, a policy can limit the number of attempts at retransmitting a segment and can define unavailable endpoints to which the segment is not retransmitted. For example, when an endpoint fails to respond to a status query, the endpoint can be marked as unavailable. The endpoint can remain unavailable until the endpoint notifies the server or the controller.

At 510, the server can determine whether it is optimal to use multicast or unicast to distribute the segment. When there is at least one set of endpoints to be reached by multicast, the segment can be distributed via multicast to a minimal multicast subtree including endpoints that have not received the segment, as illustrated at 512. The minimal multicast subtree can be a dynamically created multicast subtree or selected from a set of pre-established multicast subtrees. In an embodiment, the server may distribute the segment to multiple subtrees in parallel. At 514, the server can determine if the multicast was successful, i.e., the entire segment was received by all endpoints within the minimal multicast subtree. When the multicast was successful, the server can determine if all segments have been received, as illustrated at 506.

In an alternative embodiment, the server can send the segment via unicast to a distribution point of the subtree. The distribution point can send the segment to the downstream endpoints through a multicast to the original multicast group.

Alternatively, the server can determine if some portions of the segment were received by most endpoints within the multicast subtree. For example, if the entire first half of the segment was received by all of the endpoints, the server may not retransmit the successfully received portion. At 518, the server can partition the segment into received and unreceived segments. In addition, when a portion of the segment is received by most of the endpoints, it can be optimal to divide the segment into received and unreceived segments by one or more endpoints or subtrees. At 506, the server can determine if all segments and sub-segments have been received. Alternatively, at 516, when the multicast was unsuccessful for all endpoints, the server can attempt to multicast the segment to the subtree again, as illustrated at 512.

Returning to 510, when there are no endpoints to be reached by multicast for the segment, the server can send the segment via unicast, as illustrated at 520. In an embodiment, the server may distribute the segment via unicast to multiple endpoints in parallel. At 522, the server can determine if the segment was received by the endpoint. When the segment was received by the endpoint, the server can determine if all segments were received, as illustrated at 506.

Returning to 522, when the unicast to the endpoint was unsuccessful, the server can determine if it is optimal to partition the segment, as illustrated at 524. When partitioning is not optimal, the server can attempt to retransmit the segment via unicast, as illustrated at 520. Alternatively, the server can partition the segment as illustrated at 518.

In an example, a file can be partitioned into four segments, S1, S2, S3, and S4, intended for distribution to endpoints 104 through 118. Table 1 can show the receive status prior to distribution of the file segments, and Table 2 can show the receive status at an intermediate point during the distribution of the file.

TABLE 1

| | Multicast Tree 120 (including 124, 126, 128, 130) | | | | | | | |
|---|---|---|---|---|---|---|---|---|
| | Multicast Tree 124 (including 126 and 128) | | | | | | | |
| | Multicast Tree 126 | | | Multicast Tree 128 | | | Multicast Tree 130 | |
| Segments | EP 104 | EP 106 | EP 108 | EP 110 | EP 112 | EP 114 | EP 116 | EP 118 |
| S1 | No | No | No | No | No | No | No | No |
| S2 | No | No | No | No | No | No | No | No |
| S3 | No | No | No | No | No | No | No | No |
| S4 | No | No | No | No | No | No | No | No |

TABLE 2

| | Multicast Tree 120 (including 124, 126, 128, 130) | | | | | | | |
|---|---|---|---|---|---|---|---|---|
| | Multicast Tree 124 (including 126 and 128) | | | | | | | |
| | Multicast Tree 126 | | | Multicast Tree 128 | | | Multicast Tree 130 | |
| Segments | EP 104 | EP 106 | EP 108 | EP 110 | EP 112 | EP 114 | EP 116 | EP 118 |
| S1 | No | No | No | Yes | Yes | Yes | Yes | Yes |
| S2 | No | No | Yes | No | Yes | No | Yes | Yes |
| S3 | No | No | No | No | No | No | Yes | Yes |
| S4 | No | No | No | Partial | Partial | Partial | Yes | No |

Referring to Table 2, all segments have been received by endpoints 116 while endpoint 118 has received all segments other than S4. Consequently, at 510, the server can determine that it is optimal to unicast segment S4 to endpoint 118. Additionally, segment S1 has been fully received by endpoints 110 through 118. At 512, the server can multicast segment S1 to a subtree including endpoints 106 and 108. In an embodiment, the server can combine endpoint 104 in the multicast of segment S1. Alternatively, segment S1 can be delivered to endpoint 104 through a unicast. Further, segment S4 has been partially received by endpoints 110 through 114. At 518, the server can partition segment S4 into segments S4a, S4b, and S4c, as shown in Table 3.

TABLE 3

| | Multicast Tree 120 (including 124, 126, 128, 130) | | | | | | | |
|---|---|---|---|---|---|---|---|---|
| | Multicast Tree 124 (including 126 and 128) | | | | | | | |
| | Multicast Tree 126 | | | Multicast Tree 128 | | | Multicast Tree 130 | |
| Segments | EP 104 | EP 106 | EP 108 | EP 110 | EP 112 | EP 114 | EP 116 | EP 118 |
| S1 | Yes | Yes | Yes | Yes | Yes | Yes | Yes | Yes |
| S2 | No | No | Yes | No | Yes | No | Yes | Yes |
| S3 | No | No | No | No | No | No | Yes | Yes |
| S4a | No | No | No | No | No | No | Yes | Yes |
| S4b | No | No | No | Yes | Yes | Yes | Yes | Yes |
| S4c | No | No | No | No | Yes | Yes | No | Yes |

Referring to Table 3, while endpoints 110, 112, and 114 each partially received segment S4, each endpoint may have received different portions of segment S4. For example, the receive status can indicate that each of endpoints 110 through 114 received segment S4b but failed to receive segment S4a. Additionally, endpoints 112 and 114 received segment S4c, but endpoint 110 did not. Consequently, the server can retransmit S4a to endpoints 104 through 114, such as via multicast to a subtree including multicast tree 124 and endpoint 104.

Figure 6:
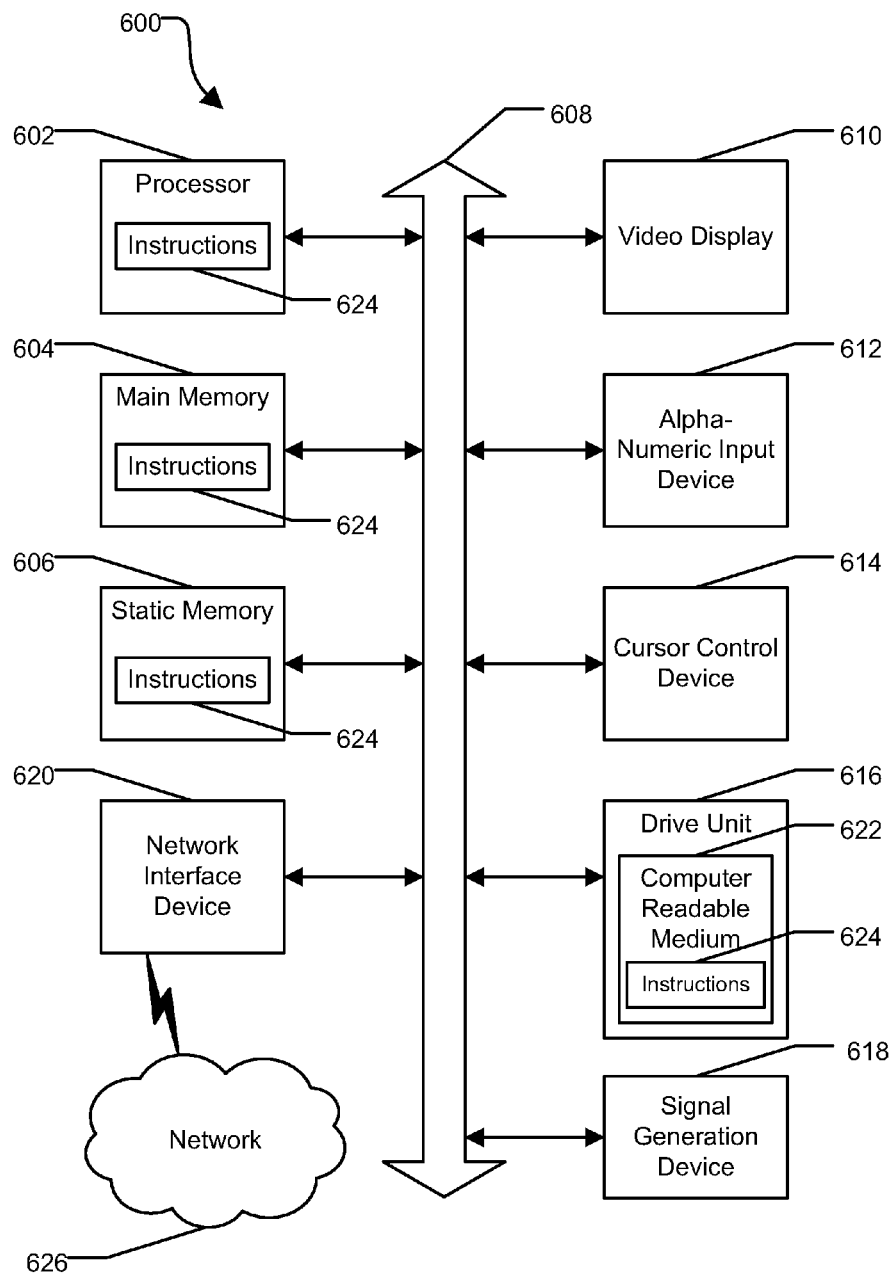
FIG. 6 is an illustrative embodiment of a general computer system.

FIG. 6 shows an illustrative embodiment of a general computer system 600. The computer system 600 can include a set of instructions that can be executed to cause the computer system to perform any one or more of the methods or computer based functions disclosed herein. The computer system 600 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

The computer system 600 may include a processor 602, such as a central processing unit (CPU), a graphics processing unit (GPU), or both. Moreover, the computer system 600 can include a main memory 604 and a static memory 606 that can communicate with each other via a bus 608. As shown, the computer system 600 may further include a video display unit 610 such as a liquid crystal display (LCD), an organic light emitting diode (OLED), a flat panel display, a solid-state display, or a cathode ray tube (CRT). Additionally, the computer system 600 may include an input device 612 such as a keyboard, and a cursor control device 614 such as a mouse. The computer system 600 can also include a disk drive unit 616, a signal generation device 618 such as a speaker or remote control, and a network interface device 620 to communicate with a network 626. In a particular embodiment, the disk drive unit 616 may include a computer-readable medium 622 in which one or more sets of instructions 624, such as software, can be embedded. Further, the instructions 624 may embody one or more of the methods or logic as described herein. In a particular embodiment, the instructions 624 may reside completely, or at least partially, within the main memory 604, the static memory 606, and/or within the processor 602 during execution by the computer system 600. The main memory 604 and the processor 602 also may include computer-readable media.

In an exemplary embodiment, a network supporting both multicast and bidirectional unicast communications, such as an Internet Protocol network, can be used to distribute one or more source files from an origin to multiple destination endpoints through one or more distribution points. A large file can be partitioned into one or more segments, each with a segment identifier. Each segment can be transferred to all endpoints as follows: first it can be transmitted using a multicast protocol to distribution points adjacent to the origin, then each such distribution point can forward it to distribution points or endpoints further downstream, and so on. At various times, endpoints can report either their success, failure, or both in receiving one or more segments back up through this distribution hierarchy. This upstream reporting may be done efficiently. When all endpoints in a subtree have successfully received a segment, no further action is required. When all endpoints in a subtree have not received a segment, it can be retransmitted using a multicast mechanism. When one or more endpoints have successfully received a segment, and one or more have not, the server can determine whether it is preferable to retransmit using a multicast or unicast approach. When some endpoints have successfully received parts of a segment, the segment can be further partitioned into sub-segments, and only these sub-segments may be retransmitted using a unicast or multicast approach.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising:
   sending a segment to a multicast group by a multicast transmission;
   receiving a set of error notifications indicating incomplete receipt of the segment from a subset of clients of the multicast group, wherein a number of clients in the subset of clients is less than a predefined minimum number of clients, wherein the subset of clients is less than a predefined percentage of the multicast group; and based upon the number of clients in the subset of clients being less than the predefined minimum number of clients, for each client of the subset of clients:

establishing, by utilizing instructions from memory that are executed by a processor, an internet protocol unicast connection to the client of the subset of clients; and resending at least a portion of the segment to the client through the internet protocol unicast connection.

2. The method of claim 1, wherein the internet protocol unicast connection is a transmission control protocol connection.

3. The method of claim 1, further comprising:
sending a second segment to the multicast group;
receiving a second set of error notifications indicating incomplete receipt of the second segment from a second subset of clients of the multicast group, wherein a number of clients in the second subset of clients of the multicast group is greater than the predefined minimum number of clients;
determining to resend at least a portion of the second segment to a third subset of clients of the multicast group based on a number of error notifications received; and
resending the at least a portion of the second segment to the third subset of clients of the multicast group by a second multicast transmission.

4. The method of claim 3 further comprising:
sending a third segment to the multicast group; receiving a third set of error notifications indicating incomplete receipt of the third segment from a fourth subset of clients of the multicast group;
establishing a second multicast group including the fourth subset of clients; and
resending at least a portion of the third segment to the second multicast group.

5. The method of claim 4 further comprising determining that the fourth subset of clients belongs to one of a common branch of a multicast tree, a common geographic region, and a common autonomous system.

6. The method of claim 3 further comprising determining a retransmit order based on a policy.

7. The method of claim 6 wherein the policy includes one of remaining within a maximum link bandwidth limit, not retransmitting a segment to an endpoint after a predetermined number of tries, not retransmitting a segment to an endpoint determined to be unavailable, prioritizing clients, minimizing network costs, and ensuring on-time delivery.

8. A system comprising:
a memory that stores instructions;
a processor that executes the instructions to perform operations, the operations comprising:
sending a segment to a multicast group by a multicast transmission;
receiving a set of error notifications indicating incomplete receipt of the segment from a subset of clients of the multicast group, wherein a number of clients in the subset of clients is less than a predefined minimum number of clients, wherein the subset of clients is less than a predefined percentage of the multicast group; and
based upon the number of clients in the subset of clients being less than the predefined minimum number of clients, for each client of the subset of clients:
establishing an internet protocol unicast connection to the client of the subset of clients; and
resending at least a portion of the segment to the client through the internet protocol unicast connection.

9. The system of claim 8, wherein the internet protocol unicast connection is a transmission control protocol connection.

10. The system of claim 8, wherein the operations further comprise:
sending a second segment to the multicast group;
receiving a second set of error notifications indicating incomplete receipt of the second segment from a second subset of clients of the multicast group, wherein a number of clients in the second subset of clients of the multicast group is greater than the predefined minimum number of clients;
determining to resend at least a portion of the second segment to a third subset of clients of the multicast group based on a number of error notifications received; and
resending the at least a portion of the second segment to the third subset of clients of the multicast group by a second multicast transmission.

11. The system of claim 10, wherein the operations further comprise:
sending a third segment to the multicast group; receiving a third set of error notifications indicating incomplete receipt of the third segment from a fourth subset of clients of the multicast group;
establishing a second multicast group including the fourth subset of clients; and
resending at least a portion of the third segment to the second multicast group.

12. The system of claim 11, wherein the operations further comprise determining that the fourth subset of clients belongs to one of a common branch of a multicast tree, a common geographic region, and a common autonomous system.

13. The system of claim 10, wherein the operations further comprise determining a retransmit order based on a policy.

14. The system of claim 13, wherein the policy includes one of remaining within a maximum link bandwidth limit, not retransmitting a segment to an endpoint after a predetermined number of tries, not retransmitting a segment to an endpoint determined to be unavailable, prioritizing clients, minimizing network costs, and ensuring on-time delivery.

15. A computer-readable device having instructions, which when loaded and executed by a processor, cause the processor to perform operations, the operations comprising:
sending a segment to a multicast group by a multicast transmission;
receiving a set of error notifications indicating incomplete receipt of the segment from a subset of clients of the multicast group, wherein a number of clients in the subset of clients is less than a predefined minimum number of clients, wherein the subset of clients is less than a predefined percentage of the multicast group; and
based upon the number of clients in the subset of clients being less than the predefined minimum number of clients, for each client of the subset of clients:
establishing, by utilizing instructions from memory that are executed by a processor, an internet protocol unicast connection to the client of the subset of clients; and
resending at least a portion of the segment to the client through the internet protocol unicast connection.

16. The computer-readable device of claim 15, wherein the internet protocol unicast connection is a transmission control protocol connection.

17. The computer-readable device of claim 15, wherein the operations further comprise:

sending a second segment to the multicast group;

receiving a second set of error notifications indicating incomplete receipt of the second segment from a second subset of clients of the multicast group, wherein a number of clients in the second subset of clients of the multicast group is greater than the predefined minimum number of clients;

determining to resend at least a portion of the second segment to a third subset of clients of the multicast group based on a number of error notifications received; and resending the at least a portion of the second segment to the third subset of clients of the multicast group by a second multicast transmission.

18. The computer-readable device of claim 17, wherein the operations further comprise:

sending a third segment to the multicast group; receiving a third set of error notifications indicating incomplete receipt of the third segment from a fourth subset of clients of the multicast group;

establishing a second multicast group including the fourth subset of clients; and resending at least a portion of the third segment to the second multicast group.

19. The computer-readable device of claim 18, wherein the operations further comprise determining that the fourth subset of clients belongs to one of a common branch of a multicast tree, a common geographic region, and a common autonomous system.

20. The computer-readable device of claim 17, wherein the operations further comprise determining a retransmit order based on a policy.

* * * * *